US011224856B2

(12) United States Patent
Chang et al.

(10) Patent No.: US 11,224,856 B2
(45) Date of Patent: Jan. 18, 2022

(54) ADSORBENTS COMPRISING ORGANIC-INORGANIC HYBRID NANOPOROUS MATERIALS FOR SORPTION OF WATER OR ALCOHOL AND USE THEREOF

(71) Applicant: Korea Research Institute of Chemical Technology, Daejeon (KR)

(72) Inventors: Jong San Chang, Daejeon (KR); U Hwang Lee, Daejeon (KR); Young Kyu Hwang, Daejeon (KR); Christian Serre, Plaisir (FR); Thomas Devic, Villevon/yvette (FR); Amandine Cadiau, Cures (FR); Norbert Stock, Kiel (DE); Nele Reimer, Kiel (DE); Michael T. Wharmby, Derbyshire (GB)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 924 days.

(21) Appl. No.: 15/575,246

(22) PCT Filed: May 18, 2016

(86) PCT No.: PCT/KR2016/005276
§ 371 (c)(1),
(2) Date: Nov. 17, 2017

(87) PCT Pub. No.: WO2016/186454
PCT Pub. Date: Nov. 24, 2016

(65) Prior Publication Data
US 2018/0133684 A1    May 17, 2018

(30) Foreign Application Priority Data
May 18, 2015    (KR) .................. 10-2015-0069157

(51) Int. Cl.
| | | |
|---|---|---|
| *B01J 20/22* | (2006.01) | |
| *B01J 20/30* | (2006.01) | |
| *B01J 20/34* | (2006.01) | |
| *H01M 10/42* | (2006.01) | |
| *B01D 53/26* | (2006.01) | |
| *B01D 53/04* | (2006.01) | |
| *B01J 20/28* | (2006.01) | |
| *C07F 5/06* | (2006.01) | |
| *H01L 51/52* | (2006.01) | |

(52) U.S. Cl.
CPC ............ *B01J 20/226* (2013.01); *B01D 53/04* (2013.01); *B01D 53/261* (2013.01); *B01J 20/28057* (2013.01); *B01J 20/28069* (2013.01); *B01J 20/3085* (2013.01); *B01J 20/3433* (2013.01); *B01J 20/3483* (2013.01); *C07F 5/069* (2013.01); *H01M 10/4235* (2013.01); *B01D 2253/204* (2013.01); *B01D 2257/704* (2013.01); *B01D 2257/80* (2013.01); *B01D 2259/40088* (2013.01); *H01L 51/5259* (2013.01)

(58) Field of Classification Search
CPC ....... B01J 20/226; B01D 53/04; B01D 53/261
See application file for complete search history.

(56) References Cited

U.S. PATENT DOCUMENTS

| | | | | |
|---|---|---|---|---|
| 6,675,601 | B2 | 1/2004 | Ebara | 62/271 |
| 6,959,875 | B2 | 11/2005 | Yabu et al. | 236/44 |
| 6,978,635 | B2 | 12/2005 | Yabu et al. | 62/271 |
| 2012/0251438 | A1* | 10/2012 | Trukhan | C07F 3/003 |
| | | | | 423/648.1 |

FOREIGN PATENT DOCUMENTS

| | | |
|---|---|---|
| CN | 102757453 | 10/2012 |
| KR | 100806589 | 2/2008 |
| KR | 1020080036013 | 4/2008 |
| KR | 1020120135114 | 12/2012 |
| KR | 1020130015013 | 2/2013 |
| KR | 1020130020745 | 2/2013 |
| WO | WO 2004113227 | 12/2004 |

OTHER PUBLICATIONS

Stahl et al., Powder Diffraction, (2012), 26(S1), p. S44-S46. (disclosed in IDS).*
Hiroyasu et al., JACS, (2014), v136, p. 4369-4381, published on Mar. 3, 2014. (disclosed in IDS).*
Funikawa et al., J. Am. Chem. Soc. 136 (2014) 4369-4381.
Ng et al., Microporous and Mesoporous Materials 114 (2008) 1-26.
Henninger et al., J. Am. Chem. Soc. 131 (2009) 2776-2777.

(Continued)

*Primary Examiner* — Yong L Chu
(74) *Attorney, Agent, or Firm* — Norton Rose Fulbright US LLP (57) ABSTRACT

Provided are a water and/or alcohol adsorbent including organic-inorganic hybrid nanoporous materials, and use thereof, and more particularly, a water and/or alcohol adsorbent having a high adsorption amount at a low relative humidity or partial pressure, of which desorption/regeneration is possible at a low temperature, the water and/or alcohol adsorbent including organic-inorganic hybrid nanoporous materials having 0.5 to 3 mol of a hydroxyl group (OH) or a hydroxide anion group (OH$^-$) per 1 mol of a central metal ion, and use thereof.

17 Claims, 5 Drawing Sheets

(56) References Cited

OTHER PUBLICATIONS

Stahl et al., Structure determination of a novel metal-organic compound synthesized from aluminum and 2,5-pyridinedicaroxylic acid *Powder Diffraction*, 26(S1):S44-S46 (2011).
Supplementary Partial European Search Report issued in corresponding European U.S. Appl. No. 16/796,781, dated Jan. 2, 2019.
Extended European Search Report issued in European Patent Application No. 16796781.9, dated Jul. 12, 2019.
Loiseau et al., "A Rationale for the Large Breathing of the Porous Aluminum Terephthalate (MIL-53) Upon Hydration" *Chemistry—A European Journal* 2004, 10, 1373-1382.
Meng et al., "pH-controlled synthesis of two new coordination polymers modeled by pyridine-2,4-dicarboxylic acid" *Inorganic Chemistry Communications* 2012, 21, 186-190.

* cited by examiner

ADSORBENTS COMPRISING ORGANIC-INORGANIC HYBRID NANOPOROUS MATERIALS FOR SORPTION OF WATER OR ALCOHOL AND USE THEREOF

CROSS-REFERENCE TO RELATED APPLICATIONS

This application is a national phase application under 35 U.S.C. § 371 of International Application No. PCT/KR2016/005276 filed May 18, 2016, which claims the benefit of priority of Republic of Korea Patent Application No. 10-2015-0069157 filed May 18, 2015. The contents of each of the above-referenced applications are incorporated into the present application by reference.

TECHNICAL FIELD

The present disclosure relates to a water and/or alcohol adsorbent including organic-inorganic hybrid nanoporous materials, and use thereof.

BACKGROUND ART

In general, organic-inorganic hybrid nanoporous materials are also called as "porous coordination polymers" [Angew. Chem. Intl. Ed., 43, 2334. 2004], or "metal-organic frameworks" [Chem. Soc. Rev., 32, 276, 2003]. The organic-inorganic hybrid nanoporous materials have been newly developed through integration of molecular coordination bond and material science. The organic-inorganic hybrid nanoporous materials have a large surface area and molecular-sized or nano-sized pores, and thus can be used not only for an adsorbent, a gas storage material, a sensor, a membrane, a functional thin film, a drug delivery material, a catalyst, a catalyst carrier, etc., but also for encapsulating guest molecules smaller than their pore size or separating molecules according to the sizes of the molecules by using their pores. Thus, the organic-inorganic hybrid nanoporous materials have been actively studied.

In particular, the organic-inorganic hybrid nanoporous material can be defined as a porous organic-inorganic polymer compound formed by bonding a central metal ion to an organic ligand, and the organic-inorganic hybrid nanoporous material refers to a crystalline compound with molecular-sized or nano-sized pores, including both organic material and inorganic material in its framework structure. In the organic-inorganic hybrid nanoporous material, a polar metal ion and a carboxylate oxygen anion are both included in its crystalline framework, and a non-polar ligand aromatic compound group coexists therein, and therefore, hydrophilicity and hydrophobicity are exhibited at the same time.

Meanwhile, an adsorbent that can easily adsorb and desorb water has various applications. For example, the adsorbent can be utilized in a water adsorption heat pump which is used for heating and cooling of industrial, medium-large sized buildings, and houses by heat energy generated or absorbed upon water adsorption/desorption of the adsorbent installed in a closed system. When solar heat, industrial waste heat, geothermal heat, etc. of 100° C. or lower is used for regeneration of the water adsorbent during operation of the water adsorption heat pump, $CO_2$ generation can be greatly reduced and energy efficiency can be increased, and therefore, it is expected to gain interest as a future environment-friendly energy-saving technology. Further, a dehumidifier may utilize the adsorbent having a property of adsorbing water at low temperature and desorbing water when it is heated to high temperature. In addition, in case where the adsorbent is used in coolers/heaters, during heating operation, the adsorbent can act as a humidifier by adsorbing the outdoor moisture of low temperature to introduce the moisture to the inside, and desorbing it in the indoor where the temperature is high, and during cooling operation, the adsorbent can achieve a comfortable indoor atmosphere by adsorbing the indoor moisture of low temperature, taking it to the outside and desorbing it in the outdoor where the temperature is high. These cooling-heating systems or adsorption heat pumps have been paid much attention as an environment-friendly technology in terms of energy efficiency. The US-Department of Energy estimated that these cooling-heating systems could reduce annual energy consumption by 117.2 million MWh and carbon dioxide emissions by 6 million tons [Desiccant Cooling: State of Art Assessment. October 1992, Ahmed Pasaran et al. NREL]. As these cooling-heating systems are simply operated and inexpensive to manufacture, they have the potential to capture a significant portion of the total $32 billion worldwide air-conditioning market.

Commercially, an adsorbent such as silica gel or zeolite (silico-alumino-phosphate) SAPO-34 is used in the water adsorption cooler and heating pump, but the adsorbent is required to have a high water adsorption amount at a temperature of 20~40° C. and a low relative humidity and a high water desorption amount at 100° C. or lower in order to increase energy efficiency. To this end, there is a need to develop a new type of a porous water adsorbent. Air-conditioners and humidity controllers applying ideas of the cooling-heating systems have been suggested in U.S. Pat. Nos. 6,978,635, 6,959,875, 6,675,601, etc. However, these patents do not describe the adsorbent used in such devices in detail, but only mention that silica gel, zeolite, ion exchange resin are used, or that an adsorbent is used. In addition, such adsorbents not only have a low adsorption amount, but also cause the operation costs to rise by requiring a high temperature of 100° C. or higher for desorption.

Until now, activated carbon and hydrophobic zeolite have been mainly used as adsorbents that can remove organic compounds present in an indoor space. Further, inorganic porous materials such as zeolite, metal phosphate, mesoporous, clay, etc. have been mainly reported as water adsorption materials (Microporous and Mesoporous Materials 114 (2008) 1-6). Since activated carbon has a very large specific surface area due to a number of nanopores and has a strong adsorption strength to non-polar molecules, it has an excellent effect in removing exhaust gas and removing smell and color, whereas zeolite is a hydrophilic adsorbent having a pore diameter of about 3 to 10 Å and thus has a strong adsorption property to carbon monoxide, carbon dioxide, and water.

On the other hand, Korean Patent No. 806,586 has suggested organic-inorganic hybrid nanoporous materials capable of adsorbing and desorbing water even at low temperature. However, the organic-inorganic hybrid nanoporous materials have to be crystallized such that they have a surface area of 1,000 m²/g or greater and a pore volume of 1.0 ml/g or greater. Accordingly, there is a disadvantage that an additional purification process is required, leading to very high manufacturing costs. There is also a disadvantage that the adsorbent exhibits sufficient adsorption capacity at a high relative humidity, but exhibits low adsorption capacity at a low relative humidity.

Meanwhile, J. Am. Chem. Soc. 2009, 131, 2776-2777 reported application of ISE-1{[Ni$_3$($\mu_3$-btc)$_2$)($\mu_4$-btre)$_2$($\mu$-

H₂O)₂].~22H₂O}(benzene-1,3,5-tricarboxylate (btc), 1,2-bis(1,2,4-triazol-4-yl)ethane (btre)) as an organic-inorganic hybrid nanoporous material to the adsorbent for the heat pump. However, there is a disadvantage that this organic-inorganic hybrid nanoporous material is very expensive, toxic due to the presence of nickel, and a complex ligand is used in the preparation process. There is also a disadvantage that a difference between water adsorption and desorption amounts is relatively small, and thus it is difficult to apply the organic-inorganic hybrid nanoporous material to the adsorbent for the heat pump using a low-temperature heat source of 95° C. or lower.

Further, US Patent Publication No. 2012/0251438 discloses an organic-inorganic hybrid nanoporous material applicable to gas separation or storage and also applicable to removal of gas-phase water from water-containing natural gas, in which a central metal ion is an aluminum ion, a magnesium ion, an iron ion, a zinc ion, or a copper ion, and a ligand is furan dicarboxylic acid anion or thiophene dicarboxylic acid anion. However, this patent does not disclose information about chemical formula and pore structure of the synthesized hybrid nanoporous material. As disclosed in the patent, a water adsorption isotherm of the hybrid nanoporous material named Al-2,5-Thiophene dicarboxylic acid MOF, which is synthesized from aluminum and thiophene dicarboxylic acid, shows that the water adsorption amount increased linearly with a low slope at a relative humidity from 15% to 55%, and the water adsorption amount at a relative humidity of 35% is only 12% by weight or less. Therefore, the organic-inorganic hybrid nanoporous material is not suitable as the adsorbent for the water adsorption heat pump.

International Patent Application No. WO 2004/113227 discloses an adsorbent including zeolite, and a humidity controlling device and a heat pump including the same. A method of increasing efficiency of a water adsorbent-applied system such as a dehumidifier, a dryer, a heat pump, etc. includes a method of optimizing the system or a method of optimizing operation conditions. However, these methods are not fundamental solutions to improvement of the system efficiency, and there is a demand for a water adsorbent having a high adsorption amount at a low relative humidity, of which desorption/regeneration is possible at a low temperature.

DISCLOSURE OF INVENTION

Technical Problem

An object of the present invention is to provide a water and/or alcohol adsorbent having a high adsorption amount at a low relative humidity or partial pressure, of which desorption/regeneration is possible at a low temperature, and use thereof.

Solution to Problem

An aspect of the present invention provides an adsorption heat transfer device using water or alcohol as a working fluid, the adsorption heat transfer device including, as a water adsorbent or an alcohol adsorbent, organic-inorganic hybrid nanoporous materials having 0.5 to 3 mol of a hydrophilic hydroxyl group (OH) or a hydroxide anion (OH⁻) group as a ligand per 1 mol of a central metal ion in a nanopore.

Another aspect of the present invention provides an adsorption water controlling device including, as a water adsorbent, organic-inorganic hybrid nanoporous materials having 0.5 to 3 mol of a hydrophilic hydroxyl group (OH) or a hydroxide anion (OH⁻) group as a ligand per 1 mol of a central metal ion in a nanopore.

Still another aspect of the present invention provides an organic light emitting device or a secondary battery device including, as a getter, organic-inorganic hybrid nanoporous materials having 0.5 to 3 mol of a hydrophilic hydroxyl group (OH) or a hydroxide anion (OH⁻) group as a ligand per 1 mol of a central metal ion.

Still another aspect of the present invention provides a water or alcohol adsorbent including organic-inorganic hybrid nanoporous materials having 0.5 to 3 mol of a hydrophilic hydroxyl group (OH) or a hydroxide anion (OH⁻) group as a ligand per 1 mol of a central metal ion in a nanopore.

Still another aspect of the present invention provides an organic-inorganic hybrid nanoporous material having a structure of an orthorhombic space group or a tetragonal space group, the organic-inorganic hybrid nanoporous material including 0.5 to 3 mol of a hydrophilic hydroxyl group (OH) or a hydroxide anion (OH⁻) group as a ligand per 1 mol of a central metal ion in a nanopore.

Still another aspect of the present invention provides an organic-inorganic hybrid nanoporous material represented by any one of the following Chemical Formulae 1 to 8:

[Chemical Formula 1]

[Chemical Formula 2]

[Chemical Formula 3]

[Chemical Formula 4]

[Chemical Formula 5]

[Chemical Formula 6]

[Chemical Formula 7]

[Chemical Formula 8]

in Chemical Formula 1, the solvent is $H_2O$, and n is a real number of 0.1 to 10, in Chemical Formula 3, the solvent is $H_2O$, an organic solvent such as DMF, or a combination thereof, and n is a real number of 0.1 to 10, in Chemical Formula 5, the solvent is $H_2O$, an organic solvent such as DMF, or a combination thereof, and n is a real number of 0.1 to 10, and in Chemical Formula 7, the solvent is $H_2O$, and n is a real number of 0.1 to 10.

Advantageous Effects of Invention

According to the present invention, provided is a water and/or alcohol adsorbent having a high adsorption amount at low relative humidity or partial pressure, of which desorption/regeneration is possible at a low temperature, the water and/or alcohol adsorbent including organic-inorganic hybrid nanoporous materials having 0.5 to 3 mol of a hydrophilic hydroxyl group (OH) or a hydroxide anion (OH⁻) group per 1 mol of a central metal ion in a nanopore. The adsorbent may be usefully applied to an adsorption refrigerator, a

BEST MODE FOR CARRYING OUT THE INVENTION

Hereinafter, the present invention will be described in detail.

To improve efficiency of a water adsorbent-applied system such as a dehumidifier, a dryer, a heat pump, etc., there is a demand for a water adsorbent having a high adsorption amount at a low relative humidity, of which desorption/regeneration is possible at a low temperature. The present invention is based on a finding that organic-inorganic hybrid nanoporous materials having 0.5 to 3 mol of a hydrophilic hydroxyl group (OH) or a hydroxide anion (OH⁻) group per 1 mol of a central metal ion in a nanopore have a high adsorption amount at a low relative humidity, of which desorption/regeneration is possible at a low temperature.

In the organic-inorganic hybrid nanoporous material, when the amount of the hydrophilic hydroxyl group (OH) or hydroxide anion (OH⁻) group is less than 0.5 mol per 1 mol of the central metal ion, hydrophilicity may be weak, and therefore, the water adsorption amount at a low relative humidity may be not high, and when the amount is more than 3 mol per 1 mol of the central metal ion, hydrophilicity may be too strong, and therefore, water desorption may not easily occur to increase a regeneration temperature.

With regard to the water adsorption amount, if the hydrophilic organic-inorganic hybrid nanoporous material retains an adsorption capacity of 0.15 gram or more, preferably 0.2 gram or more per 1 gram or 1 milliliter thereof, the hydrophilic organic-inorganic hybrid nanoporous material may exhibit superior performances when applied to an adsorption heat transfer device such as a heat pump, a heating or cooling system, or a refrigerator, or an adsorption water controlling device such as a dehumidifier, a dryer, or a humidifier. Further, when the adsorption heat pump is operated, alcohols, preferably, C1-4 alcohols such as methanol, ethanol, etc. may be used in addition to water as an adsorption working fluid, and therefore, application of the adsorbent of the present invention may be expanded to adsorption heat pumps and heating or cooling systems using other working fluids as well as water.

The organic-inorganic hybrid nanoporous material, so-called, Metal-Organic Framework (MOF), has been newly developed through integration of molecular coordination bond and material science. The hybrid nanoporous materials have a large surface area and molecular-sized or nano-sized pores, and thus can be used not only for an adsorbent, a gas storage material, a sensor, a membrane, a functional thin film, a drug delivery material, a catalyst, a catalyst carrier, etc., but also for encapsulating guest molecules smaller than their pore size or separating molecules according to the sizes of the molecules by using their pores. Thus, the organic-inorganic hybrid nanoporous materials have been actively studied. In addition, the hybrid nanoporous material has an advantage of having nano-sized pores to provide a high surface area, and therefore, the hybrid nanoporous material is mainly used in adsorbing materials or capturing compositions in the pores to transfer the composition.

A coordinatively unsaturated metal site present in the framework of the organic-inorganic hybrid nanoporous material is useful as a selective adsorption site of molecules having polar and unsaturated bonds, and thus its application to adsorption/separation of gas or liquid or its utilization as a catalyst active site has been actively studied. However, the coordinatively unsaturated metal site has a characteristic that it has high adsorption energy due to too strong interaction, and thus its regeneration is not easy.

In the present invention, it was confirmed that since the organic-inorganic hybrid nanoporous material having a hydrophilic OH ligand, which is weaker than the coordinatively unsaturated metal site in the framework, exhibits a not very strong interaction with polar molecules such as water or alcohol, the organic-inorganic hybrid nanoporous material is effective as an adsorbent of water and polar molecules. In a preferred embodiment of the present invention, the adsorbent may include the organic-inorganic hybrid nanoporous material having 0.5 to 3 mol of a hydrophilic hydroxyl group (OH) or a hydroxide anion (OH⁻) group per 1 mol of a central metal ion in a nanopore.

Accordingly, the water or alcohol adsorbent according to the present invention is advantageous in that water or alcohol desorption occurs at a low temperature to allow its regeneration. Preferably, the water or alcohol adsorbent according to the present invention may be regenerated by desorbing water or alcohol at a temperature of 100° C. or lower. More preferably, the organic-inorganic hybrid nanoporous material as the water or alcohol adsorbent according to the present invention may be regenerated by desorbing 80% or more of the total adsorption amount of adsorbed water or alcohol at a temperature of 150° C. or lower. Further, the organic-inorganic hybrid nanoporous material as the water or alcohol adsorbent according to the present invention may be regenerated by desorbing 50% or more of the total adsorption amount of adsorbed water or alcohol at a temperature of 100° C. or lower.

Further, the water or alcohol adsorbent according to the present invention has an advantage of adsorbing water or alcohol at a low relative humidity. Preferably, the water or alcohol adsorbent according to the present invention may adsorb water or alcohol at a low relative humidity of 15 to 50%.

Further, the organic-inorganic hybrid nanoporous material according to the present invention as the water adsorbent or alcohol adsorbent may exhibit adsorption of 50% or more of the total adsorption amount of the water or alcohol working fluid at a partial pressure $p/p_0$ ranging from 0.10 to 0.50 (herein, $p_0$ represents a saturated vapor pressure at an application temperature and p represents a vapor pressure upon adsorption).

In the water or alcohol adsorbent according to the present invention, the central metal ion of the organic-inorganic hybrid nanoporous material may be one or more metal ions selected from the group consisting of an aluminum ion, a cobalt ion, a nickel ion, and a magnesium ion.

In the water or alcohol adsorbent according to the present invention, the organic-inorganic hybrid nanoporous material may have heterocyclic dicarboxylic acid anion as a ligand. Preferably, the ligand may be one or more selected from the group consisting of furan dicarboxylic acid anion, pyridine dicarboxylic acid anion, thiophene dicarboxylic acid anion, and pyrazole dicarboxylic acid anion.

In a specific embodiment, the organic-inorganic hybrid nanoporous material in the water or alcohol adsorbent according to the present invention may be represented by any one of the following Chemical Formulae 1 to 8:

[Chemical Formula 1]

[Chemical Formula 2]

[Chemical Formula 3]

[Chemical Formula 4]

[Chemical Formula 5]

[Chemical Formula 6]

[Chemical Formula 7]

[Chemical Formula 8]

in Chemical Formula 1, the solvent is $H_2O$, and n is a real number of 0.1 to 10, in Chemical Formula 3, the solvent is $H_2O$, an organic solvent such as DMF, or a combination thereof, and n is a real number of 0.1 to 10, in Chemical Formula 5, the solvent is $H_2O$, an organic solvent such as DMF, or a combination thereof, and n is a real number of 0.1 to 10, and in Chemical Formula 7, the solvent is $H_2O$, and n is a real number of 0.1 to 10.

The water or alcohol adsorbent according to the present invention may be used in a variety of heat transfer processes or water adsorption/desorption processes.

The water or alcohol adsorbent according to the present invention may be used in an adsorption heat transfer device (e.g., an adsorption cooling device, an adsorption heat pump, a refrigerator operated by solar heat, geothermal heat, or waste heat), an adsorption water controlling device (e.g., a dehumidifier, a dryer, a humidifier), or an organic light emitting device or a secondary battery device.

In an exemplary embodiment of the present invention, provided was a hydrothermally stable porous solid, made under scalable conditions (water, reflux), Al-MOF bearing a 5-membered ring including an oxygen (O) atom to combine high hydrophilic character and large pore volume. The selected organic ligand (2,5-furan dicarboxylic acid, 2,5-FDCA) is particularly attractive, because it may be produced by oxidation of a compound (5-(hydroxymethyl)furfural or 5-HMF) derived from renewable biomass feedstock and environmentally friendly MOF materials may be synthesized therefrom. The novel porous solid compound prepared in an exemplary embodiment of the present invention was named Al-FDC. In an exemplary embodiment of the present invention, it was confirmed that Al-FDC has excellent hydrophilicity and high water adsorption amount at a water vapor pressure ratio, $p/p_0$ ranging from 0.1 to 0.5, which represents a relative humidity. In particular, Al-FDC of the present invention exhibits a high water adsorption amount at a low pressure, specifically, $p/p_0<0.2$ and very easy regeneration at a low temperature of 100° C. or lower without any hysteresis between water adsorption and desorption isotherms. It was confirmed that the Al-FDC material has excellent performances as an energy saving adsorbent, as compared with organic-inorganic hybrid nanoporous materials developed as water adsorbents so far.

Consequently, in a preferred embodiment of the present invention, a hydrophilic organic-inorganic hybrid nanoporous material, named Al-FDC, was synthesized by coordinate bonding of aluminum and furan dicarboxylic acid. Further, the results of water adsorption test showed that Al-FDC exhibits a high water adsorption amount and excellent stability, and therefore, Al-FDC can be used in heat transfer applications.

As described above, the present invention provides a water or alcohol adsorbent including organic-inorganic hybrid nanoporous materials having 0.5 to 3 mol of a hydrophilic hydroxyl group (OH) or a hydroxide anion ($OH^-$) group as a ligand per 1 mol of a central metal ion in a nanopore.

In the organic-inorganic hybrid nanoporous material, the central metal ion forms octahedral coordinate bonds and square-shaped porous channels. Further, the organic-inorganic hybrid nanoporous material may have a structure of an orthorhombic space group or a tetragonal space group.

As described above, the present invention provides an organic-inorganic hybrid nanoporous material having a structure of an orthorhombic space group or a tetragonal space group, the organic-inorganic hybrid nanoporous material including 0.5 to 3 mol of a hydrophilic hydroxyl group (OH) or a hydroxide anion ($OH^-$) group as a ligand per 1 mol of a central metal ion in a nanopore.

As described above, the organic-inorganic hybrid nanoporous material according to the present invention may have a heterocyclic dicarboxylic acid anion as a ligand.

As described above, in an aspect, the organic-inorganic hybrid nanoporous material according to the present invention may be represented by any one of the following Chemical Formulae 1 to 8:

[Al(OH)[(O$_2$C)—C$_4$OH$_2$—(CO$_2$)].n(solvent)  [Chemical Formula 1]

[Al(OH)[(O$_2$C)—C$_4$OH$_2$—(CO$_2$)]  [Chemical Formula 2]

[Al(OH)[(O$_2$C)—C$_5$NH$_3$—(CO$_2$)].n(solvent)  [Chemical Formula 3]

[Al(OH)[(O$_2$C)—C$_5$NH$_3$—(CO$_2$)]  [Chemical Formula 4]

[Al(OH))[(O$_2$C)—C$_4$SH$_2$—(CO$_2$)].n(solvent)  [Chemical Formula 5]

[Al(OH)[(O$_2$C)—C$_4$SH$_2$—(CO$_2$)]  [Chemical Formula 6]

Al$_2$(OH)$_4$[(O$_2$C)—C$_3$N$_2$H$_2$—(CO$_2$)].n(solvent)  [Chemical Formula 7]

Al$_2$(OH)$_4$[(O$_2$C)—C$_3$N$_2$H$_2$—(CO$_2$)]  [Chemical Formula 8]

in Chemical Formula 1, the solvent is H$_2$O, and n is a real number of 0.1 to 10, in Chemical Formula 3, the solvent is H$_2$O, an organic solvent such as DMF, or a combination thereof, and n is a real number of 0.1 to 10, in Chemical Formula 5, the solvent is H$_2$O, an organic solvent such as DMF, or a combination thereof, and n is a real number of 0.1 to 10, and in Chemical Formula 7, the solvent is H$_2$O, and n is a real number of 0.1 to 10.

In a specific exemplary embodiment, the organic-inorganic hybrid nanoporous material according to the present invention may include [Al(OH)[(O$_2$C)—C$_4$OH$_2$—(CO$_2$)].n (solvent) (wherein the solvent is H$_2$O, n is a real number ranging from 0.1 to 10); [Al(OH)[(O$_2$C)—C$_4$OH$_2$—(CO$_2$)]; [Al(OH)[(O$_2$C)—C$_5$NH$_3$—(CO$_2$)].n(solvent) (wherein the solvent is H$_2$O and DMF solvent); [Al(OH)[(O$_2$C)—C$_5$NH$_3$—(CO$_2$)]; [Al(OH)[(O$_2$C)—C$_4$SH$_2$—(CO$_2$)].n(solvent) (wherein the solvent is H$_2$O and DMF); [Al(OH)[(O$_2$C)—C$_4$SH$_2$—(CO$_2$)]; Al$_2$(OH)$_4$[(O$_2$C)—C$_3$N$_2$H$_2$—(CO$_2$)].n(solvent) (wherein the solvent is H$_2$O); and Al$_2$(OH)$_4$[(O$_2$C)—C$_3$N$_2$H$_2$—(CO$_2$)].

MODE FOR THE INVENTION

Hereinafter, the present invention will be described in more detail with reference to Examples. However, these Examples are for illustrative purposes only, and the scope of the invention is not intended to be limited by these Examples.

Example 1: Synthesis and Adsorption Property of Aluminum 2,5-furanedicarboxylate (Al-FDC) Material An organic-inorganic hybrid nanoporous material, aluminum 2,5-furanedicarboxylate (Al-FDC) was synthesized as follows. First, 30 mmol of 2,5-furan dicarboxylic acid, 30 mmol of AlCl$_3$-6H$_2$O, 30 mmol of NaOH, and 60 mL of deionized water were placed in a 100 ml-3 neck round bottom flask, and mixed with each other at room temperature for 3 hours, followed by heating at 100° C. under stirring at reflux for 24 hours. After being cooled to room temperature, a product was recovered by centrifugation.

Figure 1:
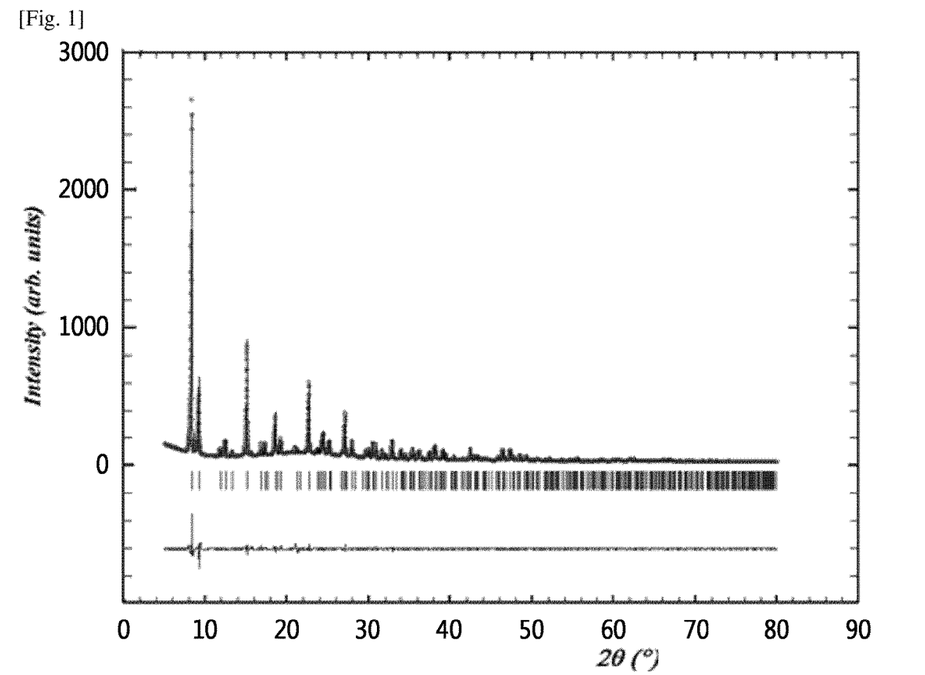
FIG. 1 shows a comparison between measured X-ray diffraction pattern of Al-FDC powder (porous aluminum-2, 5-furandicarboxylate of MIL-160 structure), marked by lines, and simulated X-ray diffraction pattern obtained by X-ray structure analysis, marked by dots.

The organic-inorganic hybrid nanoporous materials are known to have different structures and material compositions depending on coordination and bond formation, even though they are composed of the same metal ions and organic ligands. FIG. 1 shows a comparison between X-ray diffraction pattern measured by using synthesized Al-FDC powder and simulated X-ray diffraction pattern obtained by X-ray structure analysis. The structure and chemical formula obtained by the X-ray diffraction analysis elucidate that the Al-FDC material newly synthesized in the present invention is an aluminum 2,5-furanedicarboxylate material having a novel structure, which has not been reported until now. The crystal system of Al-FDC obtained by X-ray diffraction analysis was calculated to have a tetragonal space group of I4$_1$ md, a lattice length of a and b axis of 20.9902(1) Å and c axis of 10.70801(9) Å, and a unit cell volume of 4717.85 (6) Å$^3$. It was also calculated that Al-FDC has Chemical Formula of [Al(OH)[(O$_2$C)—C$_4$OH$_2$—(CO$_2$)].n(solvent) (wherein the solvent is H$_2$O, and n is a real number ranging from 0.1 to 10), and Al-FDC after being dried at 150° C. or higher has Chemical Formula of [Al(OH)[(O$_2$C)—C$_4$OH$_2$—(CO$_2$)], and dried Al-FDC has a molecular weight of about 198.1 g/mol.

Figure 2:
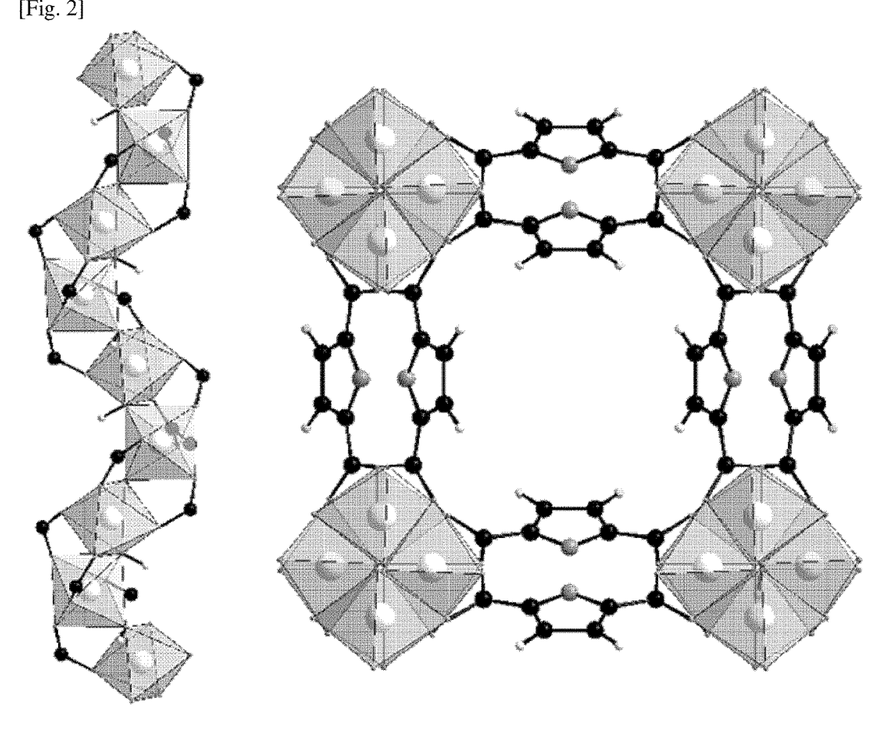
FIG. 2 shows square-shaped porous channels of Al-FDC, formed by $AlO_6$ octahedra surrounded by four carboxylate oxygen anions derived from 2,5-furan dicarboxylate ligands and two hydroxy (OH) groups.

The framework structure of Al-FDC is built from inorganic aluminum-oxygen chains linked via carboxylate groups from the ligands, and the chains may be described as AlO$_6$ octahedra cis-connected by corner. Each octahedra is surrounded by four oxygen atoms derived from four carboxylate ligands and oxygen atoms derived from two OH groups. The two OH groups linked to Al of AlO$_6$ octahedra are in cis-position and bridge the Al centers to create the chains. As shown in FIG. 2, the pore structure of Al-FDC forms square-shaped sinusoidal channels having a diameter of about ca. 5 Å.

To measure a specific surface area and a pore volume of the Al-FDC material obtained by the synthesis, a TriStar volume adsorption device manufactured by Micrometrics was used to perform a physical adsorption experiment of nitrogen at −196° C. In this regard, the Al-FDC material was dried at a vacuum level of 10$^{-4}$ Torr or higher and a pretreatment temperature of 150° C. for 6 hours, and then a nitrogen adsorption amount was measured. A physical adsorption isotherm of nitrogen thus obtained showed Type-I isotherm as in nanoporous zeolite, and a calculated BET surface area and a pore volume were 1070 m$^2$/g and 0.398 cm$^3$/g, respectively.

Figure 3:
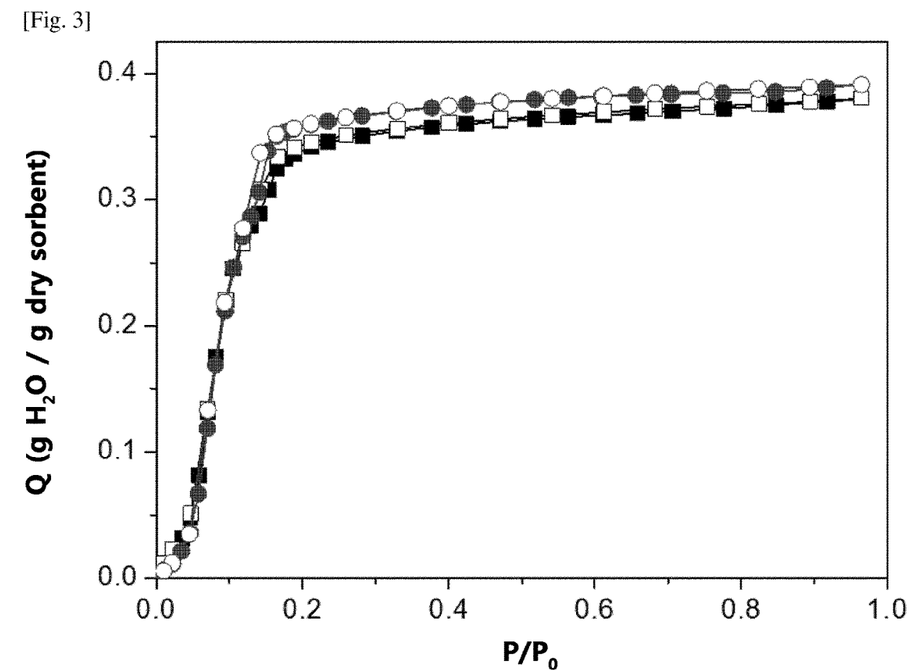
FIG. 3 shows a comparison between a water adsorption/desorption isotherm at 30° C. for Al-FDC, and a water adsorption/desorption isotherm at 30° C. for Al-FDC dried after synthesis, in which Al-FDC was exposed to boiling water at 100° C. for 1 day, and then vacuum-treated (in the graph, the isotherm of the material before exposed to boiling water is indicated by square symbol, the isotherm of the material after exposed to boiling water is indicated by round symbol, an adsorption isotherm is indicated by full symbol, and a desorption isotherm is indicated by empty symbol)

A water adsorption property of the Al-FDC material was measured by using an IGA gravimetric adsorption analyzer manufactured by Hiden. In this regard, for pretreatment, the Al-FDC material was dried at a vacuum level of 10$^{-5}$ Torr and a temperature of 150° C. for 6 hours, and then temperature was decreased to 30° C. to measure adsorption and desorption isotherms at a ratio of water vapor pressure to saturated vapor pressure (p/p$_0$) ranging from 0~1.0. The water adsorption/desorption isotherms of Al-FDC as shown in FIG. 3 has a characteristic of having S-shaped reversible isotherm in an almost saturated form at p/p$_0$>0.20. In this range, Al-FDC showed a high adsorption amount close to 0.35 g per 1 g. An excessively hydrophilic aluminosilicate zeolite, represented by NaX zeolite, shows Type-I water adsorption isotherm under condition of p/p$_0$<0.05, which makes desorption difficult. Therefore, a desorption temperature of 150° C. or higher is generally required. In contrast, a thermogravimetric analysis confirmed that 28% by weight of the Al-FDC material saturated with water is dehydrated at a low temperature of 90° C. or lower. The Al—OH groups and polar heterocyclic organic ligands in the framework of Al-FC increase hydrophilicity of the organic-inorganic hybrid nanoporous material and also interact with water molecules in an appropriate strength, and therefore, the Al-FDC material is regenerable at a much lower temperature, compared to zeolite.

Figure 4:
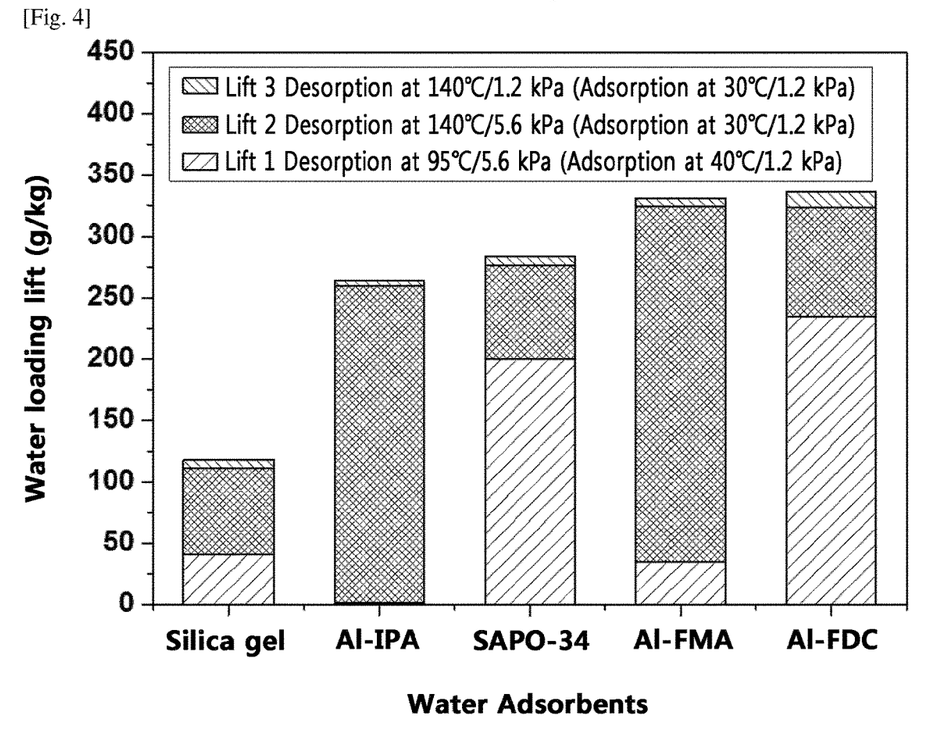
FIG. 4 is a graph showing a difference in water adsorption/desorption capacities between the Al-FDC adsorbent synthesized in the present invention, commercially available silica gel and zeolite SAPO-34 water adsorbents, and Al-IPA and Al-FMA adsorbents as comparative organic-inorganic hybrid nanoporous materials under three adsorbent selection conditions for operating an adsorption heat pump and cooling system.

The characteristics of the Al-FDC material as an energy saving water adsorbent were obvious, compared to water adsorption/desorption capacity and low temperature regeneration capacity of other commercial water adsorbents, silica gel, silicoaluminophosphate SAPO-34, and Al-IPA (porous aluminum isophthalate of CAU-10 structure) and Al-FMA (porous aluminum fumarate) which are known to have excellent water adsorption/desorption properties as an organic-inorganic hybrid nanoporous material. As shown in FIG. 4, with regard to a water loading lift indicated by Lift 1, which is a difference between water adsorption/desorption capacities obtained upon water adsorption under adsorption conditions of a temperature of 40° C. and a water vapor pressure of 1.2 kPa and upon water desorption under desorption conditions of 95° C. and 5.6 kPa, Al-FDC showed 234 g/kg of the adsorbent, whereas silica gel showed 41 g/kg, Al-IPA showed only 10 g/kg or less, and Al-FMA showed only 34 g/kg. Further, Al-FDC showed a high difference between water adsorption/desorption capacities, compared to a commercial energy saving water adsorbent, SAPO-34 of 200 g/kg, and therefore, it is expected that Al-FDC has high efficiency as an adsorbent in a closed adsorption cooling system. With regard to Lift 3, which is a difference between water adsorption/desorption capacities obtained upon desorption under desorption conditions of 140° C. and 1.2 kPa, Al-FDC showed a value of 323 g/kg, which is similar to that of Al-FMA and higher than those of other comparative adsorbents. These properties suggest that Al-FDC is able to exhibit high efficiency, compared to commercial water adsorbents, in terms of Coefficient of Performance for Cooling Purposes (COPC) and Coefficient of Performance for Heating Purposes (COPH) indicating performances of a water adsorption heat transfer device.

The hydrothermal stability of a nanoporous adsorbent is a prerequisite for heat transfer applications. In the present invention, as shown in FIG. 3, it was observed that exposure of Al-FDC at 100° C. for 1 day does not lead to any degradation of the structure as well as no significant change in its water adsorption isotherms after hydrothermal treatment in boiling water, and thus there is no change in the water loading capacity at the lift 1. To confirm the possibility of cyclic operation between adsorption and desorption steps, the water adsorption cycle experiments were repeated ten times between adsorption at 30° C. in humid $N_2$ gas (RH 80%) and desorption at 100° C. in dry $N_2$ gas. The cyclability test results of Al-FDC showed no difference in weight loss (25.3%) between the cycles from the second cycle, indicating that Al-FDC has high durability for the heat transformation application.

The ethanol adsorption property of the Al-FDC material was measured by using the IGA gravimetric adsorption analyzer manufactured by Hiden, and the pretreatment temperature before adsorption and procedures were the same as in water adsorption. The ethanol adsorption/desorption isotherms of Al-FDC were measured at 30° C. and a ratio of ethanol vapor pressure to saturated ethanol vapor pressure ($p/p_0$) ranging from 0~1.0. The measurement results show that ethanol adsorption increased almost linearly from the initial to $p/p_0$=0.18, and Al-FDC exhibited an adsorption amount of 0.131 g per 1 g of the adsorbent at $p/p_0$=0.18. Thereafter, the adsorption amount slowly increased, and Al-FDC exhibited a high adsorption amount of 0.152 g around the saturated vapor pressure.

Example 2: Synthesis and Characterization of Aluminum 3,5-pyridinedicarboxylate (Al-PDC) Material An organic-inorganic hybrid nanoporous material, aluminum 3,5-pyridinedicarboxylate (Al-PDC) was synthesized as follows. First, aluminum nitrate hexahydrate (1.20 g, 3.20 mmol) and 3,5-pyridine dicarboxylic acid (0.80 g, 4.80 mmol) were placed in a 100 ml glass reactor. DMF (18 ml) and water (2 ml) were added thereto to a total reactant volume of 20 ml. The reactor was sealed and the mixture was shaken until all solids were completely dissolved. Next, the reactants were heated in a convection oven at 120° C. for 18 hours, and then taken out of the oven, followed by cooling at room temperature. In this case, fine light yellow precipitates were observed at the bottom of the reactor. A solution containing the yellow precipitates was separated in a centrifuge, and a supernatant was carefully discarded. Solids were washed with 40 ml of distilled water in a centrifuge tube, followed by centrifugation. After washing once, the solids were dried in a 100° C. vacuum oven to remove remaining distilled water. Next, the dried yellow solids were placed in an alumina crucible and calcined in a tubular furnace at 250° C. under nitrogen atmosphere for 3 hours.

Figure 5:
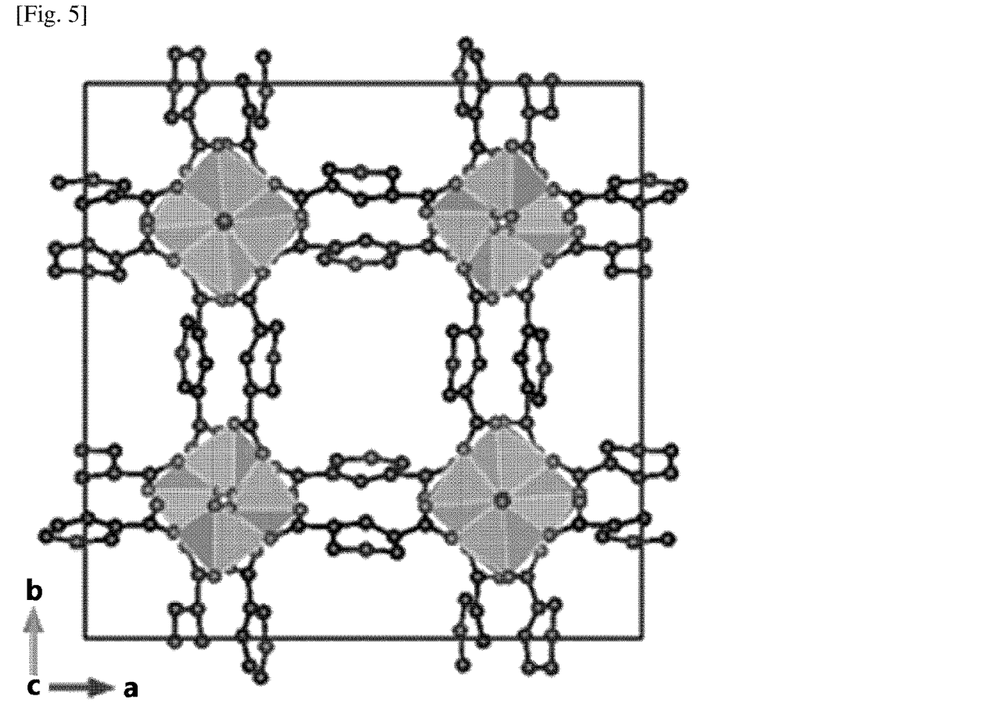
FIG. 5 shows a structure of Al-PDC calculated from X-ray diffraction analysis data, in which square porous channels are formed by linking $AlO_6$ octahedras with 3,5-pyridine dicarboxylate ligands.

The Al-PDC material thus obtained by the synthesis has Chemical Formula of $[Al(OH)[(O_2C)-C_5NH_3-(CO_2)]].n$ (solvent) (wherein the solvent is $H_2O$ and DMF solvent), and Al-PDC after being dried at 150° C. has Chemical Formula of $[Al(OH)[(O_2C)-C_5NH_3-(CO_2)]]$. A structure of Al-PDC obtained by X-ray diffraction analysis is as shown in FIG. 5. That is, Al-PDC has helical chains of corner-sharing $[AlO_6]^{3+}$ octahedra having $\mu_2$-OH groups shared along chains and running parallel to the c-axis. Each pair of neighboring $[AlO_6]^{3+}$ octahedras is crosslinked by two symmetrically independent pyridine-3,5-dicarboxylate (PDC) groups. PDC groups form unidirectional square channels running perpendicular to a-axis and b-axis and having a side length of about 6×6 Å.

Thermogravimetric analysis of Al-PDC measured under air atmosphere at a heating rate of 5° C. per minute showed three weight loss stages. A first stage showed 23.7% weight loss occurring in the range of 25-80° C., corresponding to loss of about 5 physically adsorbed water molecules from a pore. A second stage showed 7.1% weight loss occurring in the range of 380-425° C., which is associated with dehydroxylation of the framework. At a last stage, the structure was degraded when heated to 450° C. or higher.

To measure a specific surface area and a pore volume of the Al-PDC material obtained by the synthesis, a physical adsorption experiment of nitrogen was performed at −196° C. by the same method and conditions as in Example 1. A physical adsorption isotherm of nitrogen thus obtained showed Type-I isotherm, and a calculated BET surface area and a pore volume were 926 m$^2$/g and 0.430 cm$^3$/g, respectively.

A water adsorption isotherm at 30° C. for Al-PDC, which was measured by using the same method and conditions as in the water adsorption/desorption experiment of Example 1, showed similar patterns to the isotherm of Al-FDC. That is, the hysteresis between adsorption and desorption isotherms was not pronounced, and most water molecules were adsorbed at $p/p_0$<0.18, indicating that affinity of Al-PDC for water is similar to that of Al-FDC. With regard to a difference between water adsorption/desorption capacities, that is, water loading lift obtained under conditions of Lift 1 suggested in Example 1, Al-PDC showed 254 g per 1 kg of the adsorbent, which was slightly improved compared to that of Al-FDC.

Example 3: Synthesis and Characterization of Aluminum 2,5-thiophenedicarboxlate (Al-TDC) Material An organic-inorganic hybrid nanoporous material, aluminum 2,5-thiophenedicarboxlate (Al-TDC) was synthesized as follows. First, a mixture of $AlCl_3 \cdot 6H_2O$ (1158 mg, 4.8 mmol), 2,5-thiophene dicarboxylic acid (620.0 mg, 3.6 mmol), 18 mL DMF solvent, and 2 mL $H_2O$ was placed in a 20 ml glass vial, and reacted in a microwave oven (Biotage Initiator) at 100° C. for 5 hours. To remove residues of unreacted linker molecules, the synthesized compound was washed with an excessive amount of DMF, and further heated under microwave at 150° C. for 1 hour.

Figure 6:
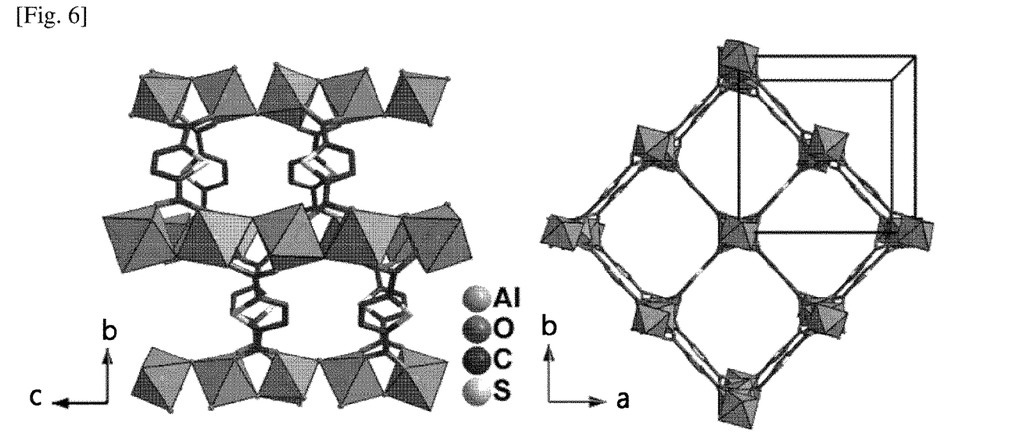
FIG. 6 shows a structure of Al-TDC calculated by X-ray diffraction analysis.

The Al-TDC material thus obtained by the synthesis has Chemical Formula of $[Al(OH)[(O_2C)-C_4SH_2-(CO_2)]\cdot n$(solvent)(wherein the solvent is $H_2O$ and DMF), and Al-TDC after being dried at 150° C. has Chemical Formula of $[Al(OH)[(O_2C)-C_4SH_2-(CO_2)]$. With regard to a structure of Al-TDC calculated by X-ray diffraction analysis, as shown in FIG. 6, Al-TDC was confirmed to crystallize in an orthorhombic space group Penn with pore channels having a diameter of about 8×8.5 Å and cell parameters of a=14.6605(10) Å, b=14.6559(12) Å, and c=13.2434(21) Å. There have been some reports about porous materials synthesized by aluminum ion and 2,5-thiophene dicarboxylic acid ligand, but no reports about a material having the same Chemical Formula and orthorhombic space group as Al-TDC of the present invention.

Figure 7:
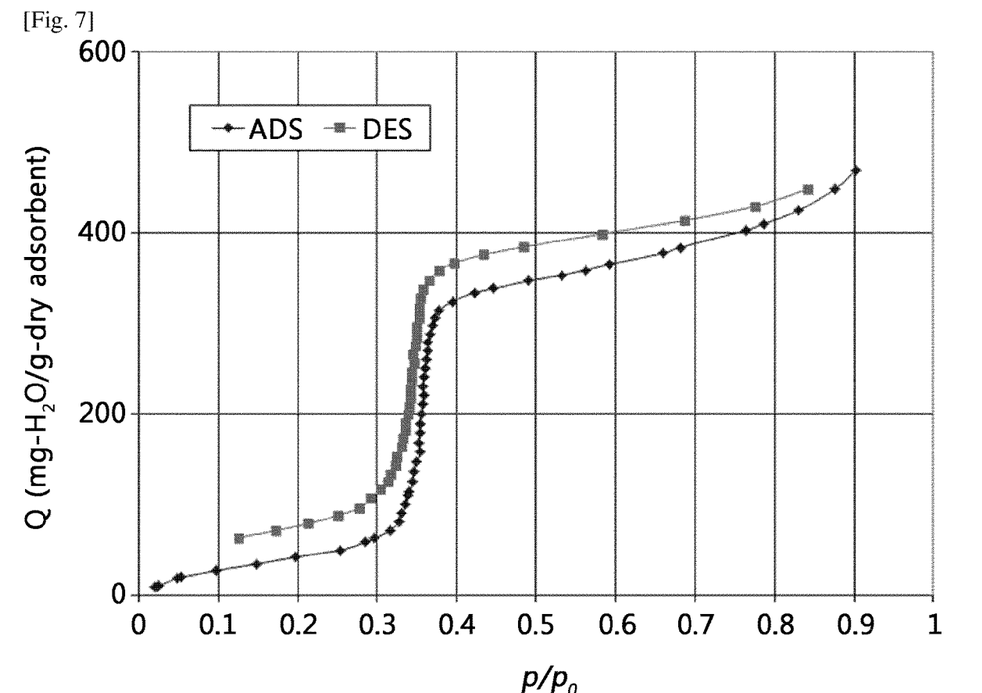
FIG. 7 shows a nitrogen physical adsorption isotherm at −196° C. and a water adsorption/desorption isotherms at 25° C. for Al-TDC, in which an adsorption isotherm is indicated by full symbol, and a desorption isotherm is indicated by empty symbol)

To measure a specific surface area and a pore volume of the Al-TDC material obtained by the synthesis, the Al-TDC material was treated at a pretreatment temperature of 250° C. for 6 hours, and then a physical adsorption experiment of nitrogen was performed at −196° C., and water adsorption/desorption isotherms were measured at 25° C. As shown in FIG. 7, a physical adsorption isotherm of nitrogen at −196° C. showed Type-I isotherm, and a calculated BET surface area was 1151 $m^2/g$, and a pore volume at $p/p_0$=0.5 was 0.480 $cm^3/g$. The water adsorption isotherm at room temperature of 25° C. showed a S shaped curve with abrupt increasing adsorption amount at $p/p_0$=0.35-0.40, and the desorption isotherm exhibited a small hysteresis. The water adsorption amount was up to 0.47 g/g, indicating applicability as a water adsorbent.

Example 4: Synthesis and Characterization of Aluminum 1H-pyrazole-3,5-dicarboxylate (Al-PDA) Material An organic-inorganic hybrid nanoporous material, aluminum 1H-pyrazole-3,5-dicarboxylate (Al-PDA) was synthesized as follows. First, 1H-pyrazole-3,5-dicarboxylic acid monohydrate (174 mg) was dissolved in water (10 ml) at room temperature. Next, $Al(OH)_3$ hydrate (78 mg) was added to the solution, and 23 mL of a reaction mixture was sealed in a Teflon-coated SUS metal autoclave reactor, and placed in an oven, followed by heating at 100° C. for 12 hours. While cooling to room temperature, produced solids were filtered, and washed with ethanol, followed by drying at room temperature.

Figure 8:
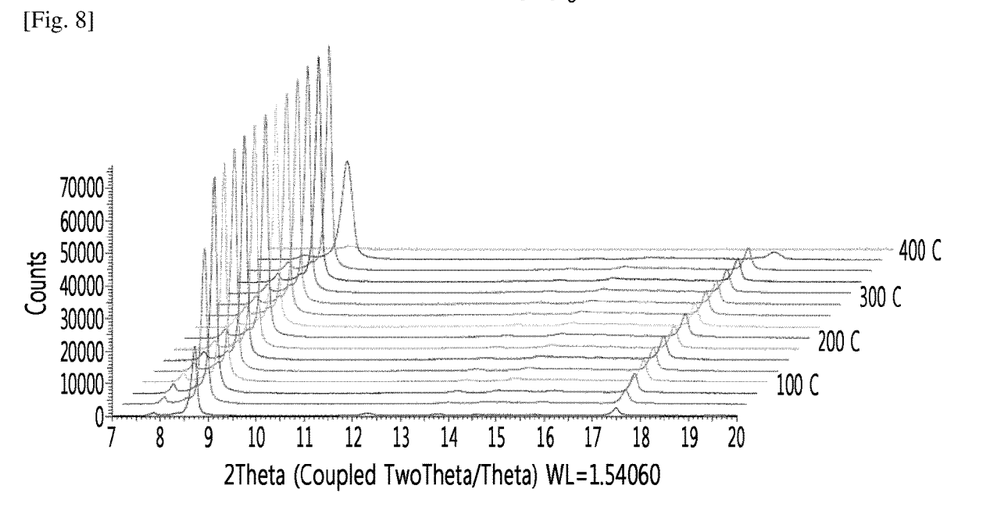
FIG. 8 shows X-ray diffraction patterns of Al-PDA powder, which were measured by increasing the temperature from 25° C. to 400° C. with an interval of 25° C.

The Al-PDA material obtained by the synthesis has Chemical Formula of $Al_2(OH)_4[(O_2C)-C_3N_2H_2-(CO_2)]\cdot n$(solvent)(wherein the solvent is $H_2O$), and Al-PDA after being dried at 150° C. has Chemical Formula of $Al_2(OH)_4[(O_2C)-C_3N_2H_2-(CO_2)]$. X-ray diffraction patterns of Al-PDA powder, which were measured by a Bruker D8 Advance diffractometer, showed the strongest diffraction peak at 2θ=8.7°. X-ray diffraction patterns under heating conditions shown in FIG. 8 show that intensity of the main peaks at 2θ=8.7°. gradually increased by desorption of water molecules adsorbed in the pores while increasing temperature from room temperature to 100° C., and a stable structure was formed without changes in the X-ray diffraction patterns up to 350° C.

Figure 9:
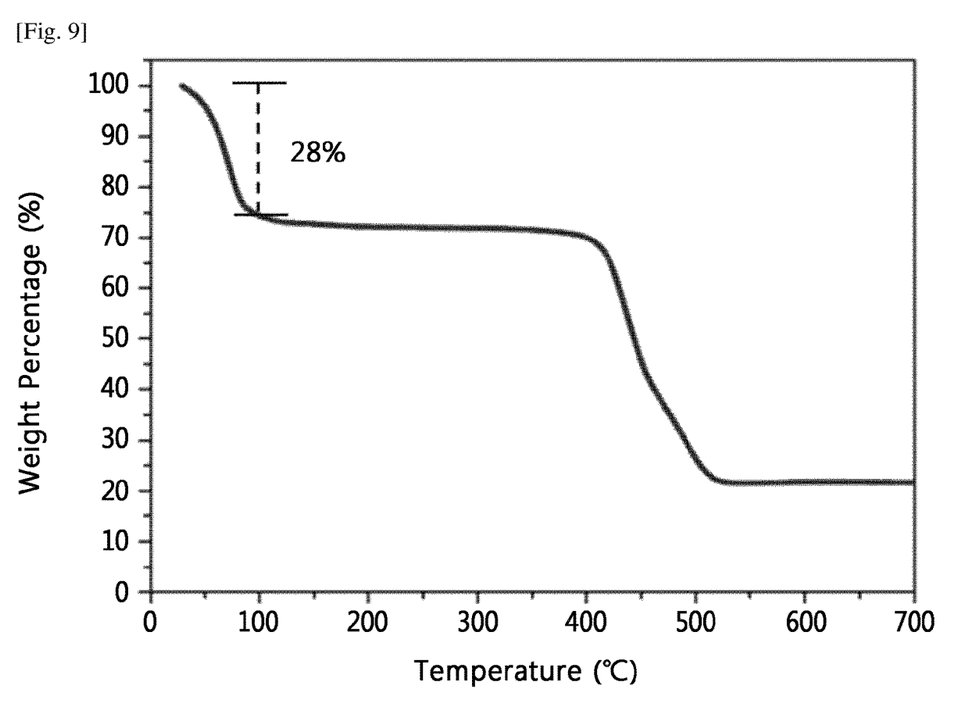
FIG. 9 shows a thermogravimetric analysis graph of Al-PDA sample, which was measured from room temperature to 700° C. at a heating rate of 5° C. per minute under air atmosphere.

Thermogravimetric analysis of the synthesized Al-PDA sample was performed from room temperature to 700° C. at a heating rate of 5° C./min under oxygen atmosphere using a Perkin Elmer Simultaneous Thermal Analyzer (STA) 6000. As shown in FIG. 9, in the thermogravimetric analysis graph, 28% weight loss occurred at 100° C. or lower, which is attributed to a weight change corresponding to desorption of water molecules weakly adsorbed in MOF pore. The large amount of water desorption at a low temperature of 100° C. or lower suggests applicability of the Al-PDA material as an energy saving water adsorbent. After water molecules adsorbed inside the pores were completely removed, the weight loss hardly occurred at a temperature ranging from 150° C. to 380° C., and the Al-PDA material was thermally stable in the above temperature range. The structure of the material was degraded at a temperature higher than 400° C., and finally, only 22 wt % of the material remained, and the rest was converted into $Al_2O_3$ material.

To measure a specific surface area and a pore volume of the Al-PDA material obtained by the synthesis, the Al-PDA material was treated at a pretreatment temperature of 150° C. for 6 hours, and then a physical adsorption experiment using nitrogen was performed at −196° C., and water adsorption/desorption isotherms were measured at 25° C. The nitrogen adsorption isotherm was measured by using BEL Japan Belsorp Mini instrument. As a result, the Al-PDA material showed a typical Type-I adsorption isotherm, and a calculated BET surface area was 1327 $m^2/g$, and an accessible pore volume was 0.52 $cm^3/g$. The water adsorption amount was up to 0.45 g/g at 25° C. to show an S-shaped adsorption isotherm.

Example 5: Large Scale Production and Water Sorption Properties of Al-FDC

A large scale production of Al-FDC was synthesized as follows. In a round bottom flask (250 ml) containing 75 ml of distilled water were introduced 75 mmol of $Al(OH)(CH_3COO)_2$ (11.71 g) (Aldrich, 90%) and 75 mmol of 2,5-furandicarboxylic acid (12.16 g). Then, the mixture was stirred under reflux for ca. 24 hrs. The resulting white solid was recovered by filtration, washed with of ethanol and dried in the oven at 100° C. to give 13.9 g of dry Al-FDC (yield=93% and STY=185 $kg \cdot m^{-3} \cdot day^{-1}$). This procedure was then used to prepare a larger amount of Al-FDC multiplying all amounts by ca. 10 times using 2 L round bottom flask.

The shaping of Al-FDC was prepared using the conventional wet granulation method recently reported for MIL-100(Fe). A known amount of Al-FDC powder was mixed with a 10% silica sol (Aldrich Co.) solution as a binder using a pan-type granulator (Gebruder Lodige, Maschinenbau GmbH D-33102). Typically, the granulation is performed by a wetting process of the mixture in the rotating fan (Marumerizer, FUJI PAUDAL Co. LTD, QJ-230) to enhance the spherical shape. Finally, the granules (spheres) were dried at 100° C. for 12 h in order to remove the residual water.

Water sorption isotherms at different temperatures (20-80° C.) were recorded using an Intelligent Gravimetric Analyzer. The analyzer allows precisely controlling the water vapor pressure (1-95 RH % with the accuracy of ±0.1% RH) and temperature (5-80° C. with the accuracy of ±0.1° C.). For the first step, sample was dried for 12 h under $N_2$ flow at T=150° C. Then, adsorption measurement was performed at fixed temperature in defined RH range. After each isotherm measurement the sample was dehydrated (T=150° C., 8 h) before being submitted to the next adsorption measurement. Al-FDC showed a very high calculated energy storage capacity, up to 300 Wh/kg, which is superior to that for commercial zeolite adsorbents (71-225 Wh/kg) with regeneration temperature of 150° C.

In a second step, based on an even larger glass reactor (2 L), three large scale synthesis were performed following this new recipe, and resulted as a whole into 400 g of powder with a good purity and surface area of 1150 $m^2 \cdot g^{-1}$. The shaping of the powder was carried out leading to 250 gram of granules of Al-FDC with size distribution of 0.5-1.8 mm.

The water sorption behavior of the powder and pellet-shaped Al-FDC was studied under conditions of a seasonal energy storage application; the cycling loading lifts are respectively equal to 0.36 and 0.32 g/g while the adsorption loading lifts are 0.37 and 0.35 g/g, respectively. These results show that the shaping procedure has no significant impact on the water uptake of Al-FDC in our conditions.

In this example, the synthesis optimization, scale-up and shaping of the most interesting solid, Al-FDC was demonstrated leading to a high purity, an excellent yield (93%), a good high Space Time Yield(STY) (>180 kg/$m^3 \cdot$day). A very good agreement was reached between the adsorption loading lift and energy storage capacities obtained in a large scale test compared to results previously calculated from the small scale powder. In addition, the energy output of the shaped Al-FDC material was very high even compared to those of commercial water adsorbents. The present results in this work pave the way for the integration of Al-FDC in energy-efficient heat allocation systems.

The invention claimed is:

1. An adsorption heat transfer device using water or alcohol as a working fluid, the adsorption heat transfer device comprising, as a water adsorbent or an alcohol adsorbent, an organic-inorganic hybrid nanoporous material having 0.5 to 3 mol of i) hydrophilic hydroxyl group (OH), or ii) hydroxide anion group ($OH^-$) as a ligand per 1 mol of a central metal ion in a nanopore, wherein the organic-inorganic hybrid nanoporous material has a structure selected from an orthorhombic space group and a tetragonal space group, and wherein the central metal ion is an aluminum ion.

2. An adsorption water controlling device comprising, as a water adsorbent, an organic-inorganic hybrid nanoporous material having 0.5 to 3 mol of i) hydrophilic hydroxyl group (OH), or ii) hydroxide anion group ($OH^-$) as a ligand per 1 mol of a central metal ion in a nanopore, wherein the organic-inorganic hybrid nanoporous material has a structure selected from an orthorhombic space group and a tetragonal space group, and wherein the central metal ion is an aluminum ion.

3. The adsorption device of claim 1, wherein the organic-inorganic hybrid nanoporous material has a water or alcohol adsorption capacity of 0.15 gram or more per 1 gram or 1 milliliter thereof at a saturation vapor pressure of the adsorbate.

4. The adsorption device of claim 1, wherein the adsorption heat transfer device is a heat pump, a heating or cooling system, or a refrigerator.

5. The adsorption device of claim 1, wherein the organic-inorganic hybrid nanoporous material as the water or alcohol adsorbent is regenerated by desorbing 80% or more of the total adsorption amount of adsorbed water or alcohol at 150° C. or lower.

6. The adsorption device of claim 5, wherein the organic-inorganic hybrid nanoporous material as the water or alcohol adsorbent is regenerated by desorbing 50% or more of the total adsorption amount of adsorbed water or alcohol at 100° C. or lower.

7. The adsorption device of claim 1, wherein the organic-inorganic hybrid nanoporous material as the water adsorbent or alcohol adsorbent exhibits adsorption of 50% or more of the total adsorption amount of the water or alcohol working fluid at a partial pressure $p/p_0$ of 0.10 to 0.50 (herein, $p_0$ represents a saturated vapor pressure at an application temperature and p represents a vapor pressure upon adsorption).

8. The adsorption device of claim 1, wherein the ligand is one or more selected from the group consisting of furan dicarboxylic acid anion, pyridine dicarboxylic acid anion, thiophene dicarboxylic acid anion, and pyrazole dicarboxylic acid anion.

9. The adsorption device of claim 1, wherein the organic-inorganic hybrid nanoporous material is represented by any one of the following Chemical Formulae 1 to 8:

in Chemical Formula 1, the solvent is $H_2O$, and n is a real number of 0.1 to 10, in Chemical Formula 3, the solvent is $H_2O$, an organic solvent, or a combination thereof, and n is a real number of 0.1 to 10, in Chemical Formula 5, the solvent is $H_2O$, an organic solvent, or a combination thereof, and n is a real number of 0.1 to 10, and in Chemical Formula 7, the solvent is $H_2O$, and n is a real number of 0.1 to 10.

10. An organic-inorganic hybrid nanoporous material having a structure selected from an orthorhombic space group and a tetragonal space group, the organic-inorganic hybrid nanoporous material comprising 0.5 to 3 mol of i) hydrophilic hydroxyl group (OH), or ii) hydroxide anion ($OH^-$) group as a ligand per 1 mol of a central metal ion, and wherein the central metal ion is an aluminum ion.

11. The organic-inorganic hybrid nanoporous material of claim 10, which is represented by any one of the following Chemical Formulae 1 to 8:

$[Al(OH)[(O_2C)—C_4OH_2—(CO_2)]].n(\text{solvent})$ [Chemical Formula 1]

$[Al(OH)[(O_2C)—C_4OH_2—(CO_2)]]$ [Chemical Formula 2]

$[Al(OH)[(O_2C)—C_5NH_3—(CO_2)]].n(\text{solvent})$ [Chemical Formula 3]

$[Al(OH)[(O_2C)—C_5NH_3—(CO_2)]]$ [Chemical Formula 4]

$[Al(OH))[(O_2C)—C_4SH_2—(CO_2)]].n(\text{solvent})$ [Chemical Formula 5]

$[Al(OH)[(O_2C)—C_4SH_2—(CO_2)]]$ [Chemical Formula 6]

$Al_2(OH)_4[(O_2C)—C_3N_2H_2—(CO_2)]].n(\text{solvent})$ [Chemical Formula 7]

$Al_2(OH)_4[(O_2C)—C_3N_2H_2—(CO_2)]$ [Chemical Formula 8]

in Chemical Formula 1, the solvent is $H_2O$, and n is a real number of 0.1 to 10, in Chemical Formula 3, the solvent is $H_2O$, an organic solvent, or a combination thereof, and n is a real number of 0.1 to 10, in Chemical Formula 5, the solvent is $H_2O$, an organic solvent, or a combination thereof, and n is a real number of 0.1 to 10, and in Chemical Formula 7, the solvent is $H_2O$, and n is a real number of 0.1 to 10.

12. The adsorption device of claim 2, wherein the organic-inorganic hybrid nanoporous material has a water or alcohol adsorption capacity of 0.15 gram or more per 1 gram or 1 milliliter thereof at a saturation vapor pressure of the adsorbate.

13. The adsorption device of claim 2, wherein the adsorption water controlling device is a dehumidifier, a dryer, or a humidifier.

14. The adsorption device of claim 2, wherein the organic-inorganic hybrid nanoporous material as the water or alcohol adsorbent is regenerated by desorbing 80% or more of the total adsorption amount of adsorbed water or alcohol at 150° C. or lower.

15. An organic light emitting device or a secondary battery device comprising, as a getter, the organic-inorganic hybrid nanoporous material of claim 10.

16. A method of adsorbing water or alcohol, by using, as a water or alcohol adsorbent, the organic-inorganic hybrid nanoporous material of claim 10.

17. The method of claim 16, wherein in the organic-inorganic hybrid nanoporous material, the central metal ion forms octahedral coordinate bonds and square-shaped porous channels.

\* \* \* \* \*